United States Patent
Kramer et al.

(10) Patent No.: US 6,834,736 B2
(45) Date of Patent: Dec. 28, 2004

(54) ACTIVE VEHICLE SUSPENSION WITH A HYDRAULIC SPRING

(75) Inventors: Bradley James Kramer, Milwaukee, WI (US); Eric Norman Griesbach, North Prairie, WI (US); Jeffrey A. Rogala, Delafield, WI (US)

(73) Assignee: HUSCO International, Inc., Waukesha, WI (US)

( * ) Notice: Subject to any disclaimer, the term of this patent is extended or adjusted under 35 U.S.C. 154(b) by 45 days.

(21) Appl. No.: 10/321,325

(22) Filed: Dec. 17, 2002

(65) Prior Publication Data

US 2004/0112659 A1 Jun. 17, 2004

(51) Int. Cl.$^7$ ............................................. B62D 49/00
(52) U.S. Cl. ..................................................... 180/89.12
(58) Field of Search ................. 180/89.12; 280/124.157, 280/124.158, 124.159, 124.16, 5.507

(56) References Cited

U.S. PATENT DOCUMENTS

| | | | |
|---|---|---|---|
| 3,701,499 A | | 10/1972 | Schubert et al. |
| 4,887,699 A | | 12/1989 | Ivers et al. |
| 4,953,089 A | | 8/1990 | Wolfe |
| 5,044,455 A | | 9/1991 | Tecco et al. |
| 5,255,764 A | | 10/1993 | Kurabayashi et al. |
| 5,348,338 A | | 9/1994 | Kuriki et al. |
| 5,362,094 A | * | 11/1994 | Jensen .................. 280/124.107 |
| 5,522,221 A | | 6/1996 | Kadlicko et al. |
| 5,555,501 A | * | 9/1996 | Furihata et al. ................ 701/37 |
| 5,603,387 A | | 2/1997 | Beard et al. |
| 5,642,282 A | * | 6/1997 | Sonehara ..................... 701/37 |
| 5,725,066 A | | 3/1998 | Beard et al. |
| 5,899,288 A | | 5/1999 | Schubert et al. |
| 6,249,728 B1 | * | 6/2001 | Streiter ....................... 701/37 |
| 6,321,887 B1 | * | 11/2001 | Kurusu et al. ............ 188/266.2 |
| 6,394,238 B1 | * | 5/2002 | Rogala ..................... 188/266.2 |
| 6,405,750 B1 | * | 6/2002 | Rogala .................... 137/493.8 |
| 6,575,484 B2 | * | 6/2003 | Rogala et al. ......... 280/124.158 |
| 6,612,375 B2 | * | 9/2003 | Rogala .......................... 172/8 |

FOREIGN PATENT DOCUMENTS

| | | |
|---|---|---|
| EP | 1 186 467 | 3/2002 |
| EP | 1 388 279 | 2/2004 |
| FR | 2 672 356 | 8/1992 |
| JP | 61 193910 | 8/1986 |

\* cited by examiner

*Primary Examiner*—Paul N. Dickson
*Assistant Examiner*—Toan C To
(74) *Attorney, Agent, or Firm*—George E. Haas; Quarles & Brady LLP

(57) ABSTRACT

A suspension system isolates the operator cab or seat from vibrations in the chassis of a vehicle. At least one hydraulic actuator is connected between the cab or seat and the vehicle chassis. An accumulator is coupled to the hydraulic actuator and acts as a hydraulic spring to attenuate high frequency vibrations. An electrically operable, three-position, closed-center control valve selectively connects the hydraulic actuator to a source of pressurized hydraulic fluid or a reservoir. Sensors detect acceleration and displacement of the cab or seat to which a controller responds by operating the valve. That control of the valve actively drives the hydraulic actuator to produce motion that counters the relatively low frequency vibrations from the chassis.

20 Claims, 3 Drawing Sheets

ACTIVE VEHICLE SUSPENSION WITH A HYDRAULIC SPRING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to suspension systems for supporting a component of a vehicle in a manner that isolates that component from vibrations in other sections of the vehicle, such as isolating the operator cab or seat from vibration of the chassis as the vehicle travels over rough terrain; and more particularly to active hydraulic suspension systems in which an actuator is drive to counter the vibration.

2. Description of the Related Art

Vibration has an adverse affect on the productivity of work vehicles in which an operator cab is supported on a chassis. Such vehicles include agricultural tractors, construction equipment, and over the road trucks. The vibrations experienced by such vehicles reduce their reliability, increase mechanical fatigue of components, and most importantly produce human fatigue due to motion of the operator's body. Therefore, it is desirable to minimize vibration of the vehicle cab or seat where the operator sits and of other components of the vehicle.

The operator of off-highway vehicles is subjected to large amplitude, low-frequency vibration when traveling over rough terrain. Previous vehicle cab suspension systems often performed poorly in the range of vibration frequencies to which the human body is most sensitive, i.e. one to ten Hertz. When subjected to vertical movement, or bounce, the human abdomen resonates at approximately four to eight Hertz and the head and eyes resonate at ten Hertz. The upper torso resonates in response to pitch and roll motion at between one and two Hertz. As a consequence, it is desirable to isolate the cab or seat of the vehicle from these vibration frequencies to improve the operator's comfort and increase equipment productivity.

Traditional approaches to vibration isolation employed either a passive or an active suspension system to isolate the vehicle cab or seat along one or more axes to reduce bounce, pitch, and roll of the vehicle. Passive systems typically placed a series of struts between the vehicle chassis and the components to be isolated. Each strut included a parallel arrangement of a spring and a shock absorber to dampen movement. This resulted in good vibration isolation at higher frequencies produced by bumps, potholes and the like. However, performance a lower frequencies, such as encountered by a farm tractor while plowing a field, was relatively poor. The lower frequency vibrations can be in the same range as the natural frequency of the system, thereby actually amplifying the vibration. One approach to decrease that amplification has been to increase the damping ratio $\zeta$ given by the expression $$\zeta = \frac{C}{2\sqrt{mK}}$$

where C is the damping coefficient, m is the mass being isolated, and K is the spring rate. Unfortunately increasing the damping ratio compromises isolation of vibration at the higher frequencies.

In addition, a two-point passive isolation system, designed to reduce roll vibration (left and right movement) creates an undesirable inertial roll of the cab when the vehicle turns. Generally, if the isolated mass, e.g. the cab, is allowed to roll with a passive suspension, a torsion bar must be added to provide stiffness which resists the inertial roll produced by a vehicle turn. The addition of a torsion bar not only adds cost to the system, it also reduces the effectiveness of other suspension components.

Active suspensions place a cylinder and piston arrangement between the chassis and the cab or seat of the vehicle to isolate that latter component. The piston divides the cylinder into two internal chambers and an electronic circuit operates valves which control the flow of hydraulic fluid to and from each chamber.

U.S. Pat. No. 4,887,699 discloses one type of active vibration damper in which the valve is adjusted to control the flow of fluid from one cylinder chamber into the other chamber. The valve is operated in response to one or more motion sensors, so that the fluid flow is proportionally controlled in response to the motion.

U.S. Pat. No. 3,701,499 describes a type of active isolation system in which a servo valve selectively controls the flow of pressurized hydraulic fluid from a source to one of the cylinder chambers, and drains oil from the other chamber back through a return line to the source. A displacement sensor and an accelerometer are connected to the mass which is to be isolated from the vibration and provide input signals to a control circuit. In response, the control circuit operates the servo valve to determine into which cylinder chamber fluid is supplied, from which cylinder chamber fluid is drained and the rate of those respective flows. This control of the cylinder produces movement of the piston which counters the instantaneous vibration motion.

Although an active isolation system is particularly effective in the low vibration frequency range, there are cost and performance penalties to use this type of system for higher frequency vibration. Because the system has to respond more rapidly at the higher frequencies, the measurement of mass movement and the reaction of the servo valve often introduce a phase lag in the counter motion, unless relatively expensive, very fast-acting components are employed. In addition, fluid must be supplied to the active suspension from the vehicle's hydraulic system. During prolonged vibrating conditions, such as when an agricultural tractor is plowing a field, the constant draw of the fluid from the tractor's pump requires that the hydraulic system have increased capabilities.

SUMMARY OF THE INVENTION

An active suspension system for isolating a first body from a second body has at least one hydraulic actuator connected between the first body and the second body. Each hydraulic actuator comprises a cylinder and a piston received within the cylinder thereby dividing the cylinder into a first chamber and a second chamber. The first and second chambers are coupled to a hydraulic circuit node, and an accumulator also is connected to the node. An electrically operable valve selectively connects the node to a source of pressurized hydraulic fluid or to a reservoir. A sensor detects movement of the first body and produces an electrical signal indicating the detected movement. A controller responds to the electrical signal from the sensor by operating the valve to move the piston relative to the cylinder so as to attenuate transmission of movement of the second body with respect to the first body.

In a first embodiment of the active suspension system, the node is directly connected to the first chamber and to the second chamber. In a second embodiment, a check valve permits fluid to flow only in a direction from the first node to the second node, and a fixed orifice is connected in parallel with the check valve. In a third version of the active suspension system, the fixed orifice is replaced with a variable orifice controlled by the controller.

The sensor may detect an amount of displacement between of the first body and the second body. Alternatively, the sensor detects inertial motion of the first body. In a preferred embodiment of the active suspension system, both types of sensors provide input signals to the controller.

DETAILED DESCRIPTION OF THE INVENTION

Figure 1:
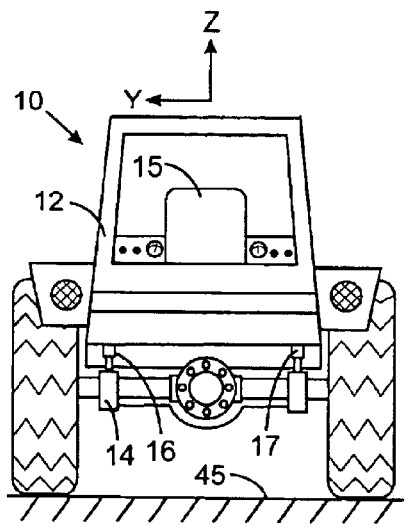
FIGS. 1 and 2 are rear and side views respectively of an agricultural tractor incorporating an active suspension system according to the present invention.
Figure 2:
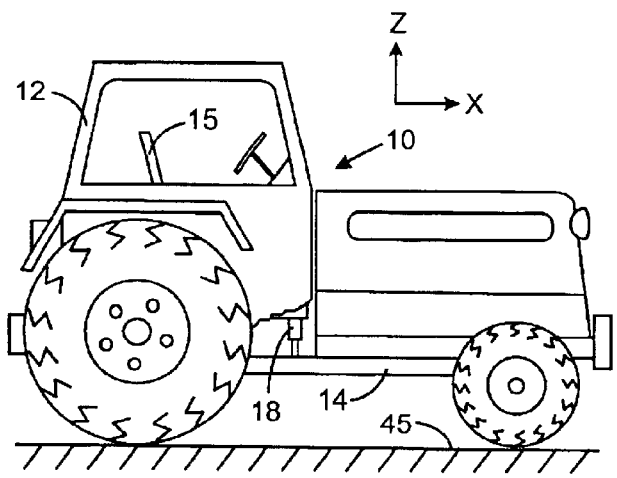

With reference to FIGS. 1 and 2, a vehicle 10, such as an agricultural tractor, has a cab 12 within which an operator sits on seat 15. The cab 12 is supported on the chassis 14 of the vehicle by three vibration isolators 16, 17 and 18. The first and second vibration isolators 16 and 17 are attached to the vehicle cab at the rear of the chassis 14. The third vibration isolator 18 is located at the center of the front of the cab 12. The three vibration isolators 16, 17 and 18 can be located at other positions underneath the cab. Although the present invention is being described in the context of an isolation system which supports the cab 12 of the vehicle 10, this system also could be employed to isolate only the operator seat 15 from the floor of the cab 12.

The vehicle cab 12 is susceptible to motion in several degrees of freedom. Movement in a vertical direction Z is commonly referred to as "bounce", whereas "roll" is rotation about the X axis of the vehicle 10, while rotation about the Y axis is referred to as "pitch." The illustrated three-point active suspension, provided by the three vibration isolators 16–18, addresses motion in these three degrees of freedom. However, one and two point suspension systems which address fewer degrees of freedom can also utilize the present invention.

Figure 3:
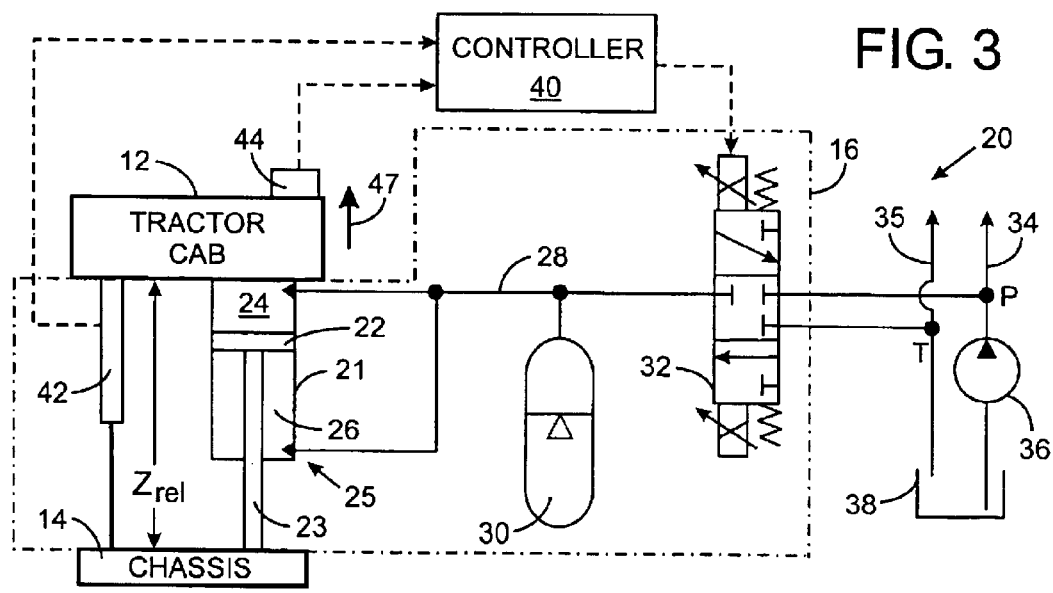
FIG. 3 is a diagram of the hydraulic circuit for one of the vibration isolators in the active suspension system.

FIG. 3 illustrates the hydraulic circuit 20 for one of the vibration isolators, for example the first isolator 16, with the understanding that identical circuits are provided for the other two vibration isolators 17 and 18. As shown, the first vibration isolator 16 has a hydraulic actuator 25 which comprises a hydraulic cylinder 21 pivotally connected to the cab of the vehicle and a piston 22 with a rod 23 pivotally attached to the vehicle chassis 14. However, the connections can be reversed in other installations of the vibration isolator. The piston 22 divides the cylinder 21 into a head chamber 24 and a rod chamber 26. The fluid ports of the head and rod chambers 24 and 26 are connected to a common conduit 28, which forms a node of the hydraulic circuit 20. A gas charged accumulator 30 also is connected to the common conduit 28 and thus is directly connected to the head chamber 24 of the cylinder. The term "directly connected" means that associated two components are connected by a conduit without any intervening elements, such as a valve, an orifice, or other device that restricts of controls the flow of fluid beyond the restriction inherent in the conduit.

A three-position, closed-center control valve 32 selectively connects the common conduit 28 to either a pump supply line 34 or a tank return line 35. The control valve 32 is operated by a solenoid which receives electric current from a controller 40. The pump supply line 34 carries pressurized fluid from a pump 36, which is driven by the engine of the vehicle 10. The tank return line 35 carries fluid to the tank 38 of the vehicle's hydraulic system. The pump supply line 34 and the tank return line 35 also are connected to the other two vibration isolators 17 and 18 and to other hydraulic circuits on the vehicle 10.

A displacement sensor 42 is connected between the cab 12 and the chassis 14 adjacent the cylinder 21 and produces an electrical signal which indicates the relative displacement (Zrel) between the cab and the chassis. That relative displacement signal is applied as an input to the controller 40. In addition, an accelerometer 44 is physically mounted on the cab 12 to provide another input signal to the controller 40 which indicates the acceleration of the cab with respect to the ground 45 on which the vehicle 10 is traveling. A velocity sensor could be used in place of the accelerometer 44.

The controller 40 is a conventional microcomputer based device and has a memory which stores a software program for execution by the microcomputer to operated the vibration isolator 16. The memory also stores data used and produced by execution of that software program. Additional circuits are provided for interfacing the microcomputer to the sensors 42 and 44 and the solenoid of valve 32. Although a separate controller 40 is shown for the first vibration isolator 16, it should be understood that a single controller can be employed to govern the operation of all three vibration isolators 16, 17 and 18.

The present active suspension system utilizes active controls in series with a hydraulic spring formed by the accumulator 30. The hydraulic spring acts as a mechanical filter for the active controls by attenuating higher frequency vibrations, while the active hydraulic portion responds to the lower frequency vibrations which are most noticeable to the vehicle operator. As a consequence, the operation of the active control is relegated to frequencies near the natural frequency of the system (e.g. less than approximately three Hertz).

The controller 40 receives the signal from sensor 42 corresponding to the relative displacement Zrel of the cab 12 with respect to the chassis 14 and a signal from accelerometer 44 corresponding to the acceleration of the vehicle cab 12 with respect to the ground 45. From those input signals indicating instantaneous motion of the cab 12 resulting from the chassis vibration, the controller determines movement of the piston 22 that is required to cancel that instantaneous motion. Next the controller 40 ascertains the direction and amount of fluid flow required to produce that desired canceling movement of the piston 22 and then derives the magnitude of electric current to apply to the control valve 32 to produce that fluid flow. That electric current magnitude is a function of the desired fluid flow and the characteristics of the particular control valve 32. The position and degree to which the control valve 32 is opened are respectively based on the direction and magnitude of the vibrational motion. When movement of the cab is not occurring, the control valve 32 is closed.

The fluid flow required from the pump 36 is minimized by requiring gravity to vent hydraulic fluid. Because fluid from the pump 36 is not required when gravity moves the cab 12 downward, thereby venting more fluid from the head chamber 24 that is required to fill the expanding rod chamber 26, hydraulic power consumption is greatly reduced from that of a traditional active suspension system. The gravity lowering configuration of the hydraulic cylinder 21 also reduces the number of control valves from two required in previous active systems to a single valve.

Figure 4:
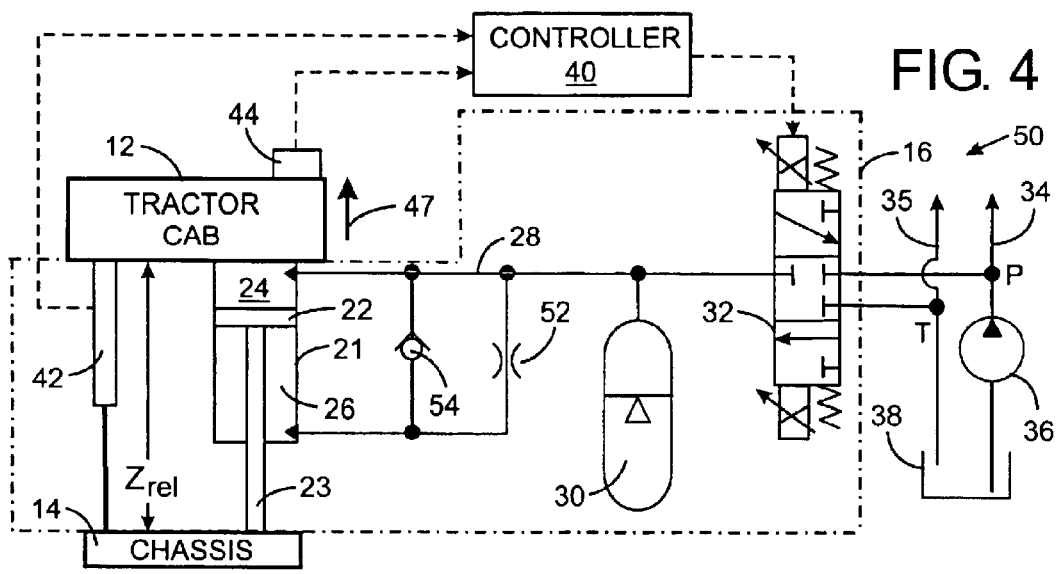
FIG. 4 is a diagram of the hydraulic circuit for a vibration isolator with fixed rebound damping.

The present active suspension system's use of gravity as the downward force to counteract vibration induced upward movement of the cab is limited to attenuating positive inertial acceleration of the cab mass (in direction of arrow 47) that is less than 1 g. Positive acceleration greater than 1 g results in an uncontrolled positive velocity of the cab (upward motion) with the system in FIG. 3. A solution to prevent the uncontrolled positive velocity is to employ regeneration with rebound damping. The embodiment of the active suspension system 50 in FIG. 4 is similar to that shown in FIG. 3 with identical components being identified with the same reference numerals. However, the second system 50 includes a fixed rebound damping orifice 52 between the two cylinder chambers 24 and 26 which provides a damping force to counter upward cab motion. A check valve 54 is connected in parallel with the rebound damping orifice 52 to allow flow there through only from the head chamber 24 to the rod chamber 26.

Figure 5:
FIG. 5 graphically depicts the relationship between cylinder velocity and an opposing force produced by a damping orifice in FIG. 4.

When the vehicle cab 12 is subjected to downward vibrational movement, the second suspension system 50 operates in the same manner as the previously described system 20, wherein the check valve 54 allows hydraulic fluid being forced from the head chamber 24 to flow relatively unimpeded into the rod chamber 26. Upward vibrations less than 1 g still are counteracted by gravity providing a downward force on the cab. During an upward vibrational motion, the check valve 54 is closed and the fixed orifice 52 creates a pressure differential between the head and rod chambers 24 and 26. The pressure in the rod chamber 26 now is greater than in the head chamber 24, thus creating a negative net force which opposes the force driving the cab acceleration. Therefore, the parallel arrangement of the check valve 54 and fixed orifice 52 creates a relationship between vibration velocity and that opposing force, wherein the opposing force is relatively constant for negative velocities and rises exponentially for positive velocities as shown in FIG. 5.

Figure 6:
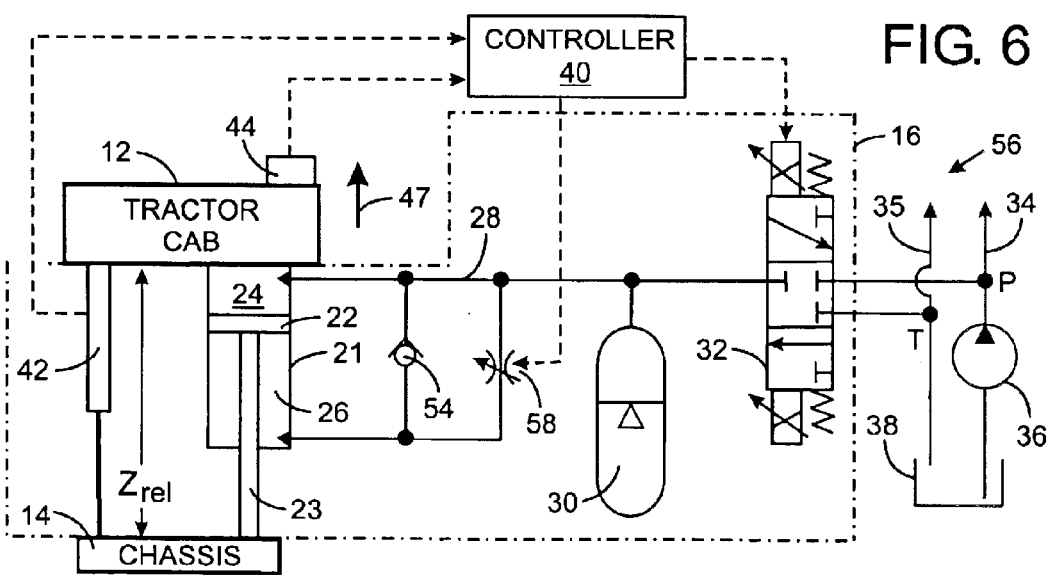
FIG. 6 is a diagram for the hydraulic circuit of a vibration isolator with variable rebound damping.

With reference to FIG. 6, another vibration isolation circuit 56 can provide variable rebound damping by replacing the fixed orifice 52 with a variable damping orifice 58 the size of which is determined by an electrical signal from the controller 40. The control of variable damping orifice 58 is a function of the accelerometer signal and the relative displacement of the cab provided by sensor 42.

In addition, the actuator 25 can be protected from extreme extension by closing the damping orifice 58 as the piston 22 approaches the end of its stroke within the cylinder. The relative displacement signal produced by sensor 42 indicates the position of the piston 22 within cylinder 21 and thus is used by the controller 40 to determine when the piston is approaching the end of its stroke. To prevent extreme compression of the actuator 25, the controller 40 operates the control valve 32 to stop venting the fluid to the tank 38 and to convey pressurized fluid from the supply line 34 to the actuator.

Figure 7:
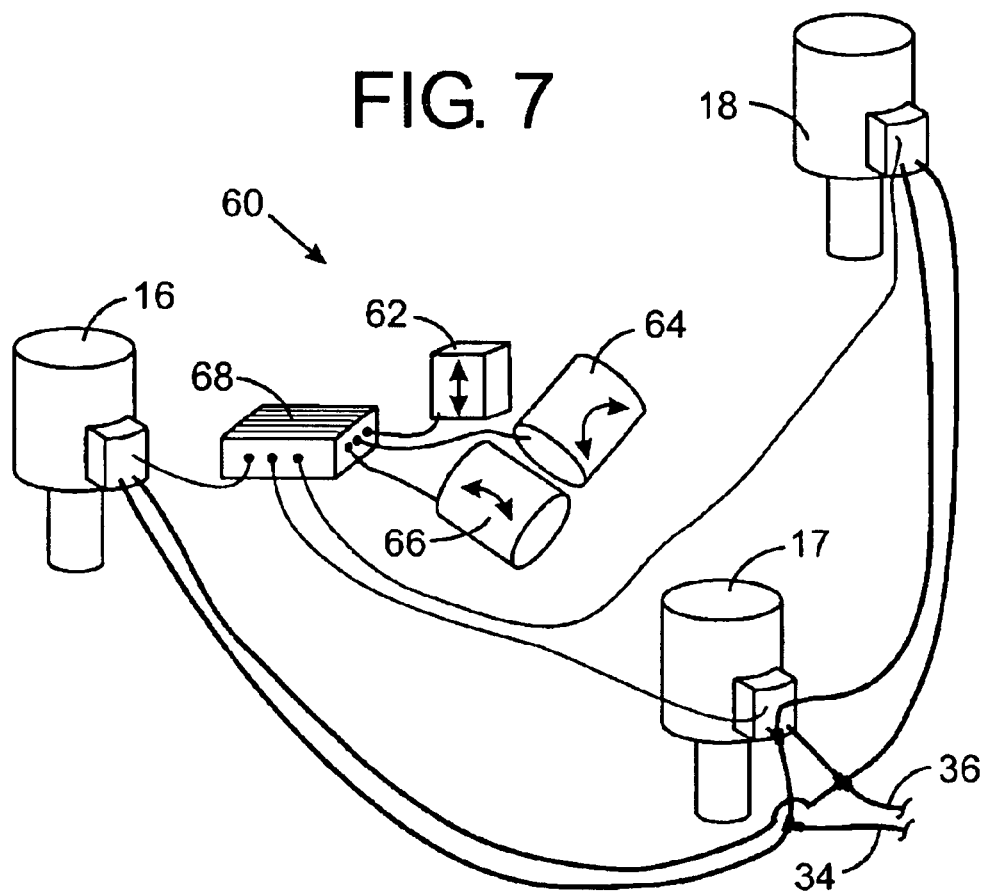
FIG. 7 is a schematic representation of another embodiment of the active suspension system for the agricultural tractor.

Although the individual subsystems shown in FIGS. 3, 4, and 6 can be used for each of the vibration isolators 16, 17 and 18, a single controller and a common set of cab motion detectors can be employed as shown in FIG. 7. In this active suspension system 60, the hydraulic circuit for each vibration isolator is the same as that shown in one of those prior figures. However, instead of a separate accelerometer for each vibration isolator 16–18, this system 60 employs a single accelerometer 62 centrally located on the operator cab 12 to sense vertical acceleration (i.e. bounce). A pair of gyroscopes 64 and 66 also are mounted on the cab 12 to sense pitch and roll angular motion of the vehicle cab 12. The accelerometer 62 and the two gyroscopes 64 and 66 provide electrical input signals to a common controller 68 that operates the three-position, closed-center control valve 32 in each vibration isolator 16, 17 and 18. Each vibration isolator still includes a displacement sensor 42 which measures the relative displacement between the cab and the chassis at the respective vibration isolator. The signals from the displacement sensor 42 also are applied to the controller 68.

The controller 68 responds to the signals from the set of sensors 42 and 62–66 and determines how to drive the hydraulic actuator 25 (the piston and cylinder arrangement) in the three vibration isolators 16–18 to counter the vibration detected by the sensors. For example, if only bounce occurs, then all the vibration isolators 16, 17 and 18 are driven in the same direction. On the other hand, when only roll is sensed, only the first and second vibration isolators 16 and 17 at the rear of the tractor (FIG. 1) are driven to counter that roll vibration. Furthermore, to counteract pitch of the tractor 12, the two rear vibration isolators 16 and 17 are driven in one direction while the front vibration isolator 18 is driven in the opposite direction. It should be understood that travel over rough terrain likely produced all three types of vibration concurrently and thus the controller responds simultaneously to signals from all the sensors.

In this final active suspension system 60, a single controller 68 and shared motion sensors 62–66 are employed to operate the vibration isolators 16, 17 and 18 to damp vibration in three degrees of freedom.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An active suspension system for isolating a first body from vibration in a second body, said active suspension system comprising:

at least one hydraulic actuator connected between the first body and the second body and comprising a cylinder and a piston defining a first chamber and a second chamber in the cylinder;

a hydraulic circuit node in continuous fluid communication with the first chamber and to the second chamber;

a hydraulic spring connected to the hydraulic circuit node;

a valve which is electrically operable to selectively connect the hydraulic circuit node to a source of pressurized hydraulic fluid or to a reservoir to control the flow of hydraulic fluid between the hydraulic circuit node and the source or reservoir;

a first sensor which detects motion of the first body and produces an electrical signal indicating that motion; and a controller connected to the first sensor and the valve, the controller responding to the electrical signal from the first sensor by applying the control signal to the valve to produce movement of the piston relative to the cylinder, thereby attenuating transmission of vibration from the second body to the first body.

2. The apparatus as recited in claim 1 wherein the valve has a third position in which the node is isolated from both the source of pressurized hydraulic fluid and the reservoir.

3. The apparatus as recited in claim 1 wherein the hydraulic circuit node is directly connected to both the first chamber and the second chamber.

4. The apparatus as recited in claim 1 further comprising:
a check valve coupling the first chamber to the second chamber; and
a fixed orifice connected in parallel with the check valve.

5. The apparatus as recited in claim 1 further comprising:
a check valve coupling the first chamber to the second chamber; and
a variable orifice connected in parallel with the check valve and coupled to the controller which varies the variable orifice.

6. The apparatus as recited in claim 1 wherein the first sensor detects an amount of displacement between of the first body and the second body.

7. The apparatus as recited in claim 6 further comprising a second sensor detects acceleration of the first body.

8. The apparatus as recited in claim 6 further comprising a second sensor detects rotation of the first body.

9. The apparatus as recited in claim 1 wherein the first sensor detects acceleration of the first body.

10. An active suspension system for isolating a first body from vibration in a second body, said active suspension system comprising:

at least one hydraulic actuator connected between the first body and the second body and comprising a cylinder and a piston received within the cylinder, the piston dividing the cylinder into a first chamber above the piston and a second chamber below the piston;

a hydraulic circuit node directly connected to the first chamber and in continuous fluid communication with the second chamber;

an accumulator connected to the hydraulic circuit node;

a three-position valve which is electrically operable to connect the hydraulic circuit node to a source of pressurized hydraulic fluid in a first position and to a reservoir in a second position, and to isolate the hydraulic circuit node from both the source and the reservoir in a third position;

a first sensor which detects an amount of displacement between of the first body and the second body;

a second sensor detects acceleration of the first body; and a controller which responds to the first sensor and to the second sensor by operating the valve to move the piston relative to the cylinder thereby attenuating transmission of vibration from the second body to the first body.

11. The apparatus as recited in claim 10 wherein the hydraulic circuit node is directly connected to the first chamber and to the second chamber.

12. The apparatus as recited in claim 10 further comprising:
a check valve coupling the first chamber to the second chamber, wherein fluid can flow through the first check valve only in a direction from the first chamber to the second chamber; and
a fixed orifice connected in parallel with the check valve.

13. The apparatus as recited in claim 10 further comprising:
a check valve coupling the first chamber to the second chamber, wherein fluid can flow through the first check valve only in a direction from the first chamber to the second chamber; and
a variable orifice connected in parallel with the check valve and coupled to the controller which varies the variable orifice.

14. An active suspension system for isolating a first body from vibration in a second body, said active suspension system comprising:

a first sensor which detects motion of the first body in a first degree of freedom;

a second sensor which detects motion of the first body in a second degree of freedom;

a third sensor which detects motion of the first body in a third degree of freedom;

three vibration isolators connected between the first body and the second body and each vibration isolator comprising:

(a) a hydraulic actuator having a cylinder and a piston which defines a first chamber and a second chamber in the cylinder, (b) a hydraulic circuit node connected to the first chamber and coupled to the second chamber, (c) an accumulator connected to the hydraulic circuit node, and (d) a three-position valve which is electrically operable to selectively connect the hydraulic circuit node to a source of pressurized hydraulic fluid or a reservoir; and a controller responding to signals from the first, second, and third sensors by selectively operating the valve of each of the three vibration isolators to operate the respective hydraulic actuator to attenuate transmission of vibration from the second body to the first body.

15. The apparatus as recited in claim 14 wherein the hydraulic circuit node of each hydraulic actuator is directly connected to the first chamber and to the second chamber of the respective cylinder.

16. The apparatus as recited in claim 14 wherein each hydraulic actuator further comprises:
a check valve coupling the first chamber to the second chamber of the respective cylinder; and
a fixed orifice connected in parallel with the check valve.

17. The apparatus as recited in claim 14 wherein each hydraulic actuator further comprises:
   a check valve coupling the first chamber to the second chamber of the respective cylinder; and
   a variable orifice connected in parallel with the check valve and connected to the controller which varies the variable orifice.

18. The apparatus as recited in claim 14 wherein each hydraulic actuator further comprises a displacement sensor which detects an amount of displacement between of the first body and the second body.

19. The apparatus as recited in claim 14 wherein at leas one of the first sensor, the second sensor, and the third sensor is an accelerometer.

20. The apparatus as recited in claim 14 wherein at least one of the first sensor, the second sensor, and the third sensor is a gyroscope.

* * * * *